G. RÁCY.
FLOUR SIFTER.
APPLICATION FILED SEPT. 10, 1918.
1,310,543.
Patented July 22, 1919.
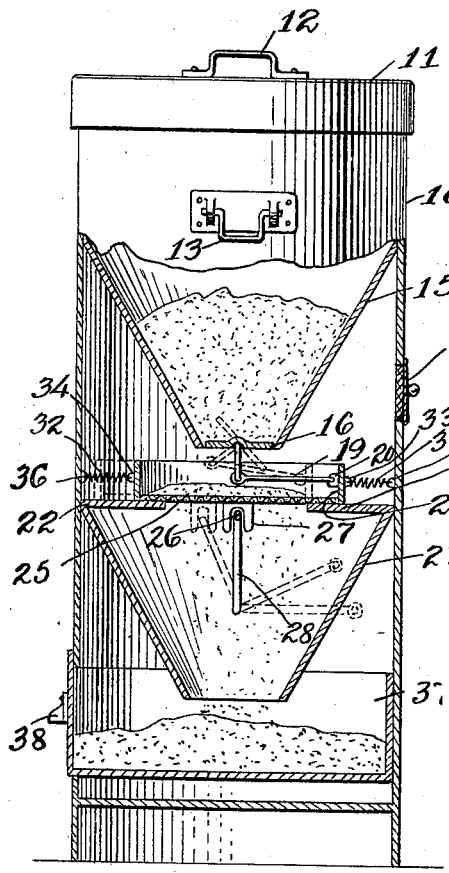
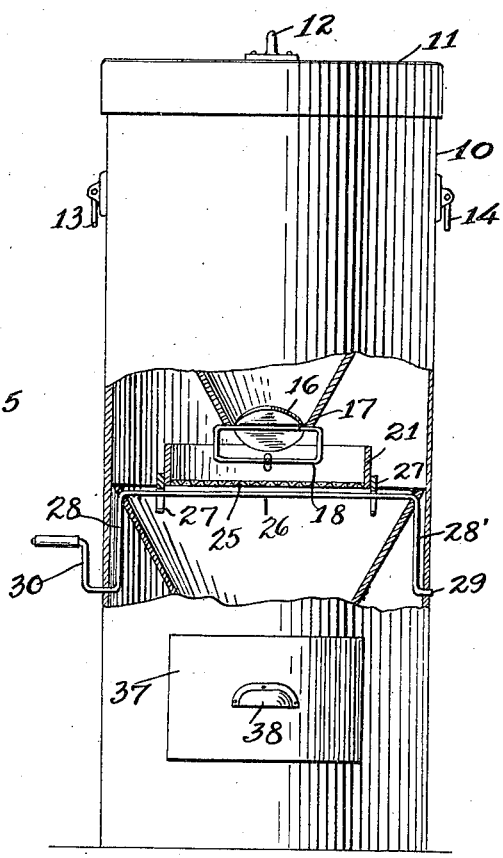
Inventor
Gábor Rácy
By his
Oscar Geier
Attorney

UNITED STATES PATENT OFFICE.

GÁBOR RÁCY, OF BRIDGEPORT, CONNECTICUT.

FLOUR-SIFTER.

1,310,543.  Specification of Letters Patent.  Patented July 22, 1919.

Application filed September 10, 1918. Serial No. 253,379.

*To all whom it may concern:*

Be it known that I, GÁBOR RÁCY, a subject of the King of Hungary, residing at Bridgeport, county of Fairfield, and State of Connecticut, have invented certain new and useful Improvements in Flour-Sifters, of which the following is a specification.

This invention relates to improvements in flour-sifters and bin, and it is the object of the invention to devise an apparatus of this kind in which the flour is fed uniformly to the sifter without liability of clogging.

Another object of the invention is to provide a flour-sifter in which the flour is fed from the storage bin automatically in certain quantities for equal distribution on the sieve.

A further object of the invention is to so construct the apparatus that no dust will escape, and to insure the sieve against the liability of clogging.

These and other like objects are attained by the novel construction and combination of parts hereinafter described and shown in the accompanying drawing, forming a material part of this disclosure, and in which:—

Figure 1 is a side elevation of the apparatus partly in section, and

Fig. 2 is a front view of the apparatus also partly in section.

In the drawing like numbers of reference indicate corresponding parts in each figure.

The flour receptacle or bin 10 is closed on top by a cover 11 which is removable by means of the handle 12, while handles 13 and 14 on both sides of the bin allow a convenient transportation of the same.

Within the receptacle 10, and in the upper part of the same, a removable hopper or storage vessel 15 for the flour to be sifted is provided having a bottom plate 16 tiltable over the upper bar 17 of a substantially square frame 18 to the lower bar of which an operating rod 19 is secured which is fastened with its free end to an eye 20 or the like on the inner wall of a sifter or sieve 21. The sieve 21 rests upon the top plate 22 of a hopper 23 provided in the lower part of the receptacle 10, having a central opening formed by the top flange 24 on which the sieve 21 with its bottom 25 is executing a reciprocatory sliding movement when operated by means of an operating bar 26 suitably secured in bearings 27 of the sieve bottom. Said bar 26 is provided for this purpose with lateral downwardly extended arms 28, 28', one of which, 28' is journaled with its rectangularly bent end in the wall of the receptacle 10, as indicated at 29, while the other, 28, is also rectangularly bent and extends through the wall of the receptacle 10 for the reception of a crank arm or operating handle 30. Springs 31 and 32 are secured at oppositely disposed points to the outer wall of the sieve as at 33 and 34 respectively and to the inner wall of the receptacle 10, as shown at 35 and 36.

The lower hopper 23 is open at the bottom and extends into a sliding drawer below the same which is shown at 37 provided at its front with a suitable handle 38.

A door 39 may be conveniently arranged in the wall of the receptacle 10 for the removal of the foreign matter separated from the flour by the sifting operation.

The apparatus operates in the following manner: Upon the operation of the crank 30 in a reciprocatory manner, the operating bar 26 and its bearing 27 will execute a reciprocating motion which is transmitted to the sieve and transformed on account of the connection of the same with the wall of the receptacle by means of the springs 31 and 32 into a shaking movement by which the frame 18, on account of its connection with the sieve wall by the rod 19, and its suspension in the eye 40, will be displaced as shown in dotted lines in Fig. 1 and at the same time will tilt the bottom 16 of the hopper 15 and a certain quantity of flour will be deposited in the sieve, which upon the continued operation of the crank will be passed through the bottom of the sieve into the hopper 23 and the drawer 37 from which the sifted flour may be removed, while the foreign matter contained in the flour in the hopper or bin 15 will be retained in the sieve from where it may be conveniently removed from time to time through the door 39, or the hopper 15 may be removably secured within the casing 10, so that after removal of the cover 11 free access may be had to the interior of the apparatus for cleaning and other purposes.

Having thus described my invention, what I claim as new, and desire to secure by Letters Patent is:

In a flour sifter and bin of the character described, comprising a casing, a hopper within said casing, a tiltable bottom for the said hopper, a sieve disposed in said casing for reciprocatory shaking motion, bearings secured to the bottom on the outside of said sieve, means secured in said bearings, for reciprocating said sieve, springs secured to the inner walls of said casing on opposite points and to the outer walls of said sieve, adapted to transform the reciprocatory motion of the sieve into a shaking motion, a square frame within said sieve to the upper bar of which said tiltable bottom is secured, and an operating rod secured to the lower bar of said frame and to the inner wall of said sieve, for tilting said bottom upon the operation of said sieve reciprocating means, substantially as described and for the purpose set forth.

In testimony whereof I have affixed my signature.

GÁBOR RÁCY.